United States Patent
Jones et al.

(10) Patent No.: US 7,834,310 B2
(45) Date of Patent: Nov. 16, 2010

(54) POSITION ENCODER'S SIGNAL PROCESSING METHOD AND SYSTEM

(75) Inventors: Michael Eugene Jones, West Linn, OR (US); David Douglas Martenson, Oregon City, OR (US)

(73) Assignee: Xerox Corporation, Norwalk, CT (US)

( * ) Notice: Subject to any disclaimer, the term of this patent is extended or adjusted under 35 U.S.C. 154(b) by 222 days.

(21) Appl. No.: 12/144,069

(22) Filed: Jun. 23, 2008

(65) Prior Publication Data

US 2009/0314930 A1    Dec. 24, 2009

(51) Int. Cl.
*G01J 9/00* (2006.01)
(52) U.S. Cl. .............................. 250/231.17; 250/231.13; 356/617
(58) Field of Classification Search ................................ 250/231.13–231.18, 237 G, 237 R; 356/614, 356/616–617; 347/37, 104; 33/1 N, 1 PT; 359/227–236
See application file for complete search history.

(56) References Cited

U.S. PATENT DOCUMENTS

| | | | |
|---|---|---|---|
| 5,506,579 A * | 4/1996 | Spaulding ..................... 341/11 |
| 5,604,345 A | 2/1997 | Matsuura ................. 250/237 G |
| 6,222,183 B1 * | 4/2001 | Taniguchi et al. ....... 250/231.13 |
| 6,653,847 B2 * | 11/2003 | Little, Jr. ..................... 324/637 |
| 6,972,403 B2 * | 12/2005 | Martenson et al. ..... 250/231.13 |
| 2004/0135076 A1 | 7/2004 | Martenson et al. ..... 250/231.13 |
| 2004/0135087 A1 | 7/2004 | Martenson ............... 250/341.8 |
| 2004/0262502 A1 | 12/2004 | Martenson et al. ..... 250/231.13 |
| 2004/0262503 A1 | 12/2004 | Martenson et al. ..... 250/231.13 |
| 2005/0006574 A1 | 1/2005 | Martenson et al. ...... 250/237 G |
| 2005/0110817 A1 | 5/2005 | Burke et al. ................... 347/12 |
| 2005/0253052 A1 | 11/2005 | Martenson et al. ..... 250/231.13 |
| 2007/0103531 A1 | 5/2007 | Jones et al. ................. 347/103 |

* cited by examiner

*Primary Examiner*—Thanh X Luu
*Assistant Examiner*—Francis M Legasse, Jr.
(74) *Attorney, Agent, or Firm*—Melissa L. Asfahani; Kermit D. Lopez; Luis M. Ortiz

(57) ABSTRACT

An encoder position signal processing system comprises an analog encoder reader and a codewheel. The codewheel possesses an optical track that modulates the quadrature encoder signal amplitude in order to generate an amplitude change (home pulse) once per revolution of the codewheel. The analog encoder reader outputs a quadrature signal comprised of sine and cosine signals. The quadrature signal is converted to a magnitude signal that is sampled in order to generate a rate of change (ROC) signal, which increases the signal-to-noise ratio. An algorithm using the characteristic shape of the ROC home pulse signal can then be applied to the ROC signal to increases robustness of detecting the home pulse.

20 Claims, 11 Drawing Sheets

POSITION ENCODER'S SIGNAL PROCESSING METHOD AND SYSTEM

TECHNICAL FIELD

Embodiments are generally related to rendering devices and techniques. Embodiments are also related to position encoders. Embodiments are additionally related to methods and systems for processing encoder home position signal.

BACKGROUND OF THE INVENTION

Rendering devices such as printers can employ position encoders to accurately track and control the position of moving components such as rotating shafts, rollers, and print drums. Additionally the position encoder can be utilized to determine a reference or home position for the component whose position is being tracked. Many factors can adversely affect the operation of the position encoder making it difficult to accurately and reliably determine the home position. An improved method is needed to detect the home position.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved rendering device, such as a printer.

It is a further aspect of the present invention to provide for a reliable home position signal processing system that can supply accurate print drum home position information to a printer's process direction print head alignment algorithms.

It is another aspect of the present invention to provide for an improved method and system for assuring that the print quality of a printer remains consistent over the life of the printer even though encoder components may degrade.

It is a further aspect of the present invention to provide for an improved method and system that increases the robustness of the home position detection.

The aforementioned aspects and other objectives and advantages can now be achieved as described herein. An encoder home position signal processing system and method are disclosed, which includes the use of an encoder reader that outputs a sine and cosine quadrature signal and a codewheel that is rotated perpendicular to an axis of rotation. The codewheel possesses an optical track that modulates the quadrature encoder signal amplitude in order to generate an amplitude change once per revolution of the codewheel. This amplitude change can be interpreted as the home position of the codewheel. The sine and cosine are converted to a single magnitude signal that can then be sampled at, for example, 20 kHz in order that a signal-processing algorithm can compute a rate of change (ROC) signal that has an increased signal-to-noise ratio. To further increases the signal-to-noise ratio, the ROC signal can be filtered. To increases the robustness of the home position detection, an algorithm to detect the characteristic shape of the ROC home position signal can be applied to the ROC signal.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

By way of illustrative example, only a rotary transmissive optical encoder system will be described herein, but it should be understood that the techniques described could also be applied to a linear encoder system or reflective optical encoder or any encoder that produces sine and cosine signals and that have home position encoded as an amplitude change of the sine and cosine waveforms.

Figure 1:
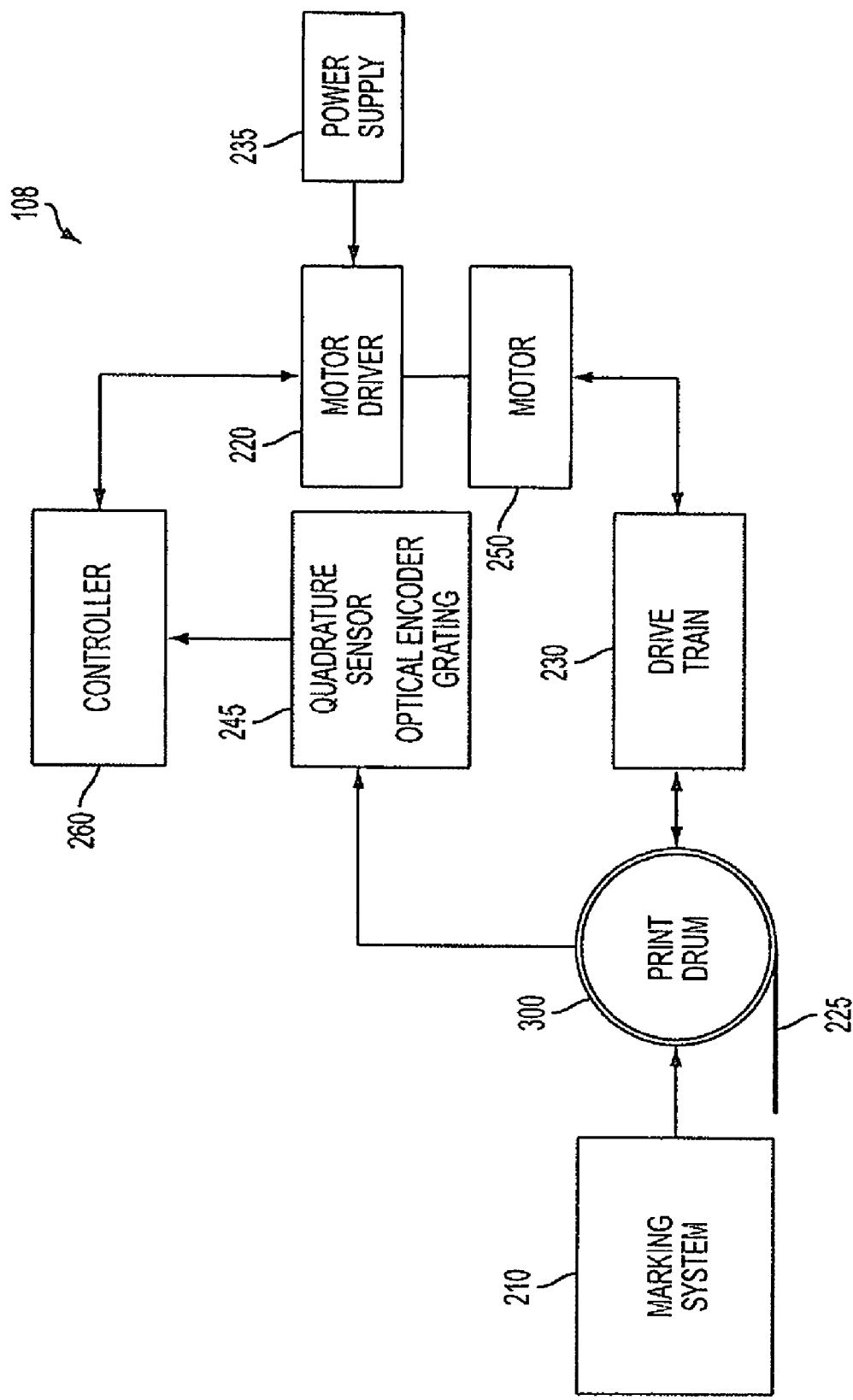
FIG. 1 illustrates a schematic block diagram of a rendering device, which can be implemented in accordance with a preferred embodiment.

FIG. 1 illustrates a schematic block diagram of a rendering device 108, which can be implemented, in accordance with a preferred embodiment. Note that in FIGS. 1-2, identical or similar parts or elements are generally indicated by identical reference numerals. Also note that for purposes of this discussion, it is assumed that the rendering device 108 functions primarily or exclusively as a printer. It can be appreciated, however that the rendering device 108 may also be a copier, fax machine, scanner, etc.

Figure 2:
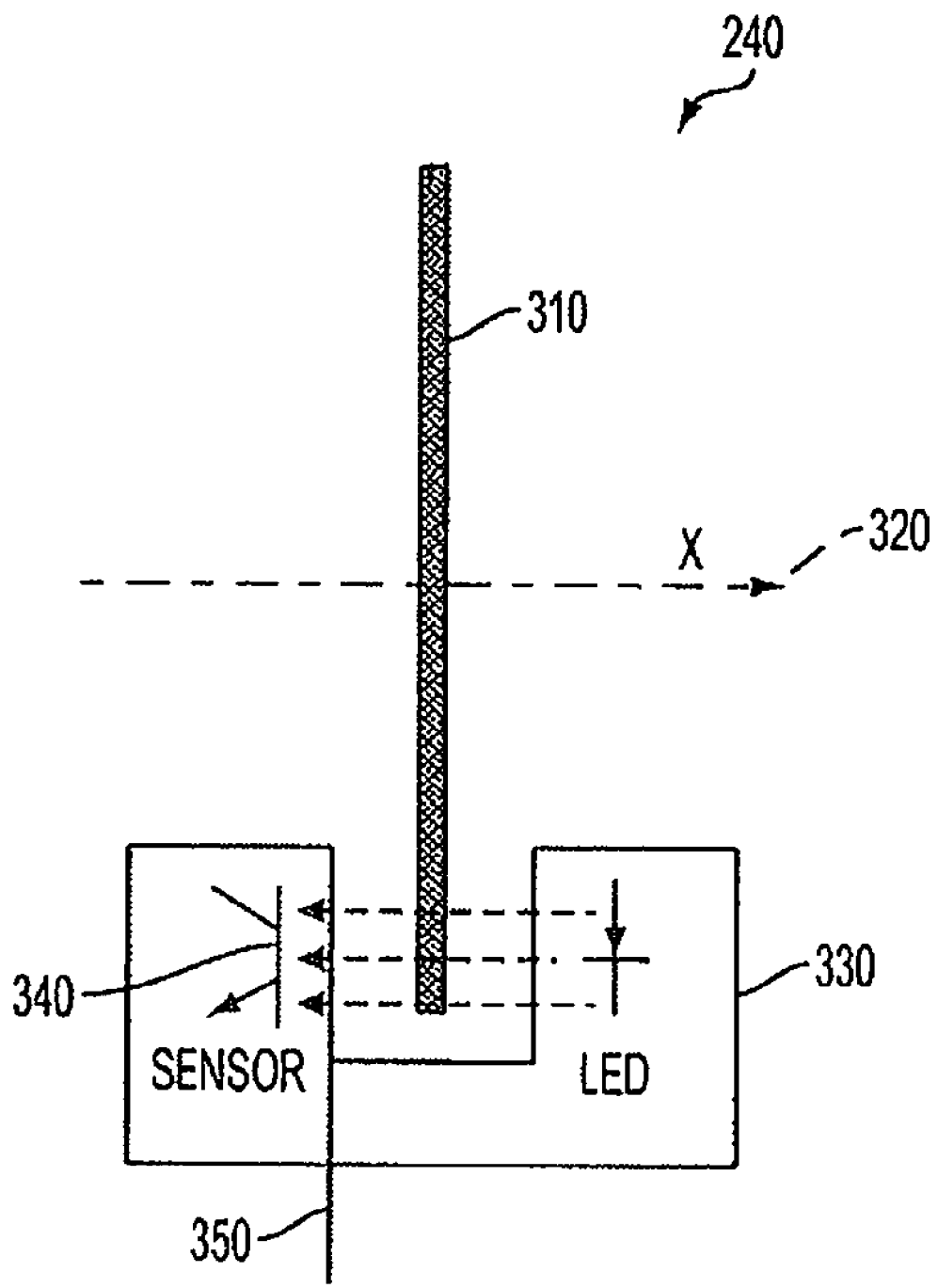
FIG. 2 illustrates a schematic view of the encoder system depicted in FIG. 1, including the use of a codewheel and an encoder sensor, in accordance with a preferred embodiment.

As depicted in FIG. 1, a marking system 210 can be utilized to apply marking material to a print drum 300 to form an image that is transferred to a print output medium 225. The marking system 210 can be, for example, an ink jet marking system or an electro photographic marking system. The print drum 300 has connected to it an encoder system 240 that includes the use of a codewheel 310, as depicted in FIG. 2. The rendering device 108 also includes the use of a motor driver 220 in association with a motor 250. A power supply 235 supplies power to motor driver 220, which in turn is capable of communicating electronically with a controller 260.

The configuration depicted in FIG. 1 also includes the use of an encoder system 240 that communicates electronically with controller 260. Encoder system 240 provides output signals, which are transmitted to the controller 260. The print drum 300 is mechanically connected to the encoder system. The rendering device 108 can also include the use of a drive train 230 that makes the mechanical connection with the motor 250 and is further associated with the print drum 300.

Figure 3:
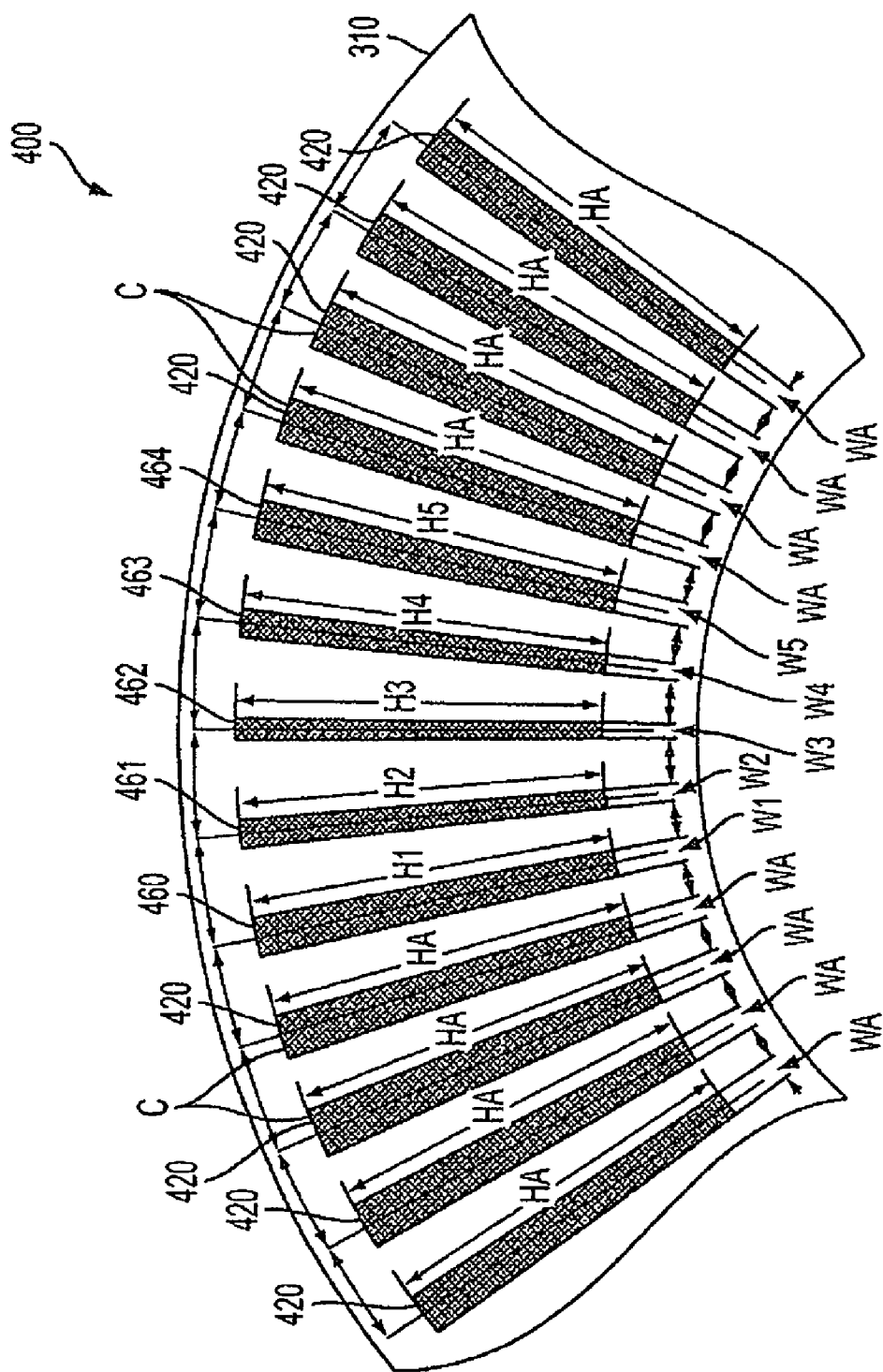
FIG. 3 illustrates a schematic view of a codewheel optical track, in accordance with a preferred embodiment.

FIG. 2 illustrates a schematic view of the encoder system 240 illustrated in FIG. 1, in accordance with a preferred embodiment. FIG. 2 depicts a codewheel 310 and a sine and cosine output quadrature encoder sensor 330 that move relative to each other pursuant to the movement of the print drum 300. The codewheel 310 constitutes a transmissive codewheel and includes an optical track 400 (as shown in FIG. 3) that can be encoded to identify a predetermined home position of the print drum 300. The motor 250 is associated with a motor driver 220 and a power supply 235 and can drive the print drum 300 through the drive train 230. The controller 260 depicted in FIG. 1 accepts signals from the encoder system, performs signal processing, controls the motor driver, and is capable of managing other printer and/or rendering operations.

The encoder system 240 shown schematically in FIG. 2 utilizes a transmissive codewheel 310 and an optical analog encoder reader 330 that has as its output, a quadrature signal. An example of an encoder sensor 330 is a light source or emitter such as a light emitting diode (LED), a lens to collimate the light and a sensor array typically composed of a plurality of photodiodes or phototransistors 340. The optical encoder reader can be implemented by, for example, an Avago HEDS-9710-R50 optical incremental encoder module that is available from Avago Technologies, Inc, or another similar device. The light source and sensor array are separated by a gap within which the codewheel passes.

In accordance with a preferred embodiment, the codewheel 310 can be mounted concentric to and perpendicular with axis 320 which is also the rotation axis of the print drum 300. The codewheel 310 optical track is composed of a plurality of uniformly spaced opaque bars and transmissive spaces around the circumference of the codewheel. As the codewheel 310 rotates on the axis of rotation 320, light from the emitter passes through the codewheel and the resulting light and dark shadow pattern is detected by the sensor array to produce the sine and cosine quadrature output signals. Additionally the width of the bars and spaces are varied to encode the home position in one section of the optical track. This bar/space width variation causes the amplitude of the quadrature signal to decrease once per revolution of the codewheel.

FIG. 3 illustrates a schematic view of an encoded home region of a codewheel optical track 400, in accordance with one possible embodiment. Note that an example of optical track 400 is disclosed in U.S. Pat. No. 6,972,403, entitled "Position Encoder," which issued to Martenson et al on Dec. 6, 2005 and is incorporated herein by reference in its entirety. U.S. Pat. No. 6,972,403 is assigned to the Xerox Corporation.

Figure 4:
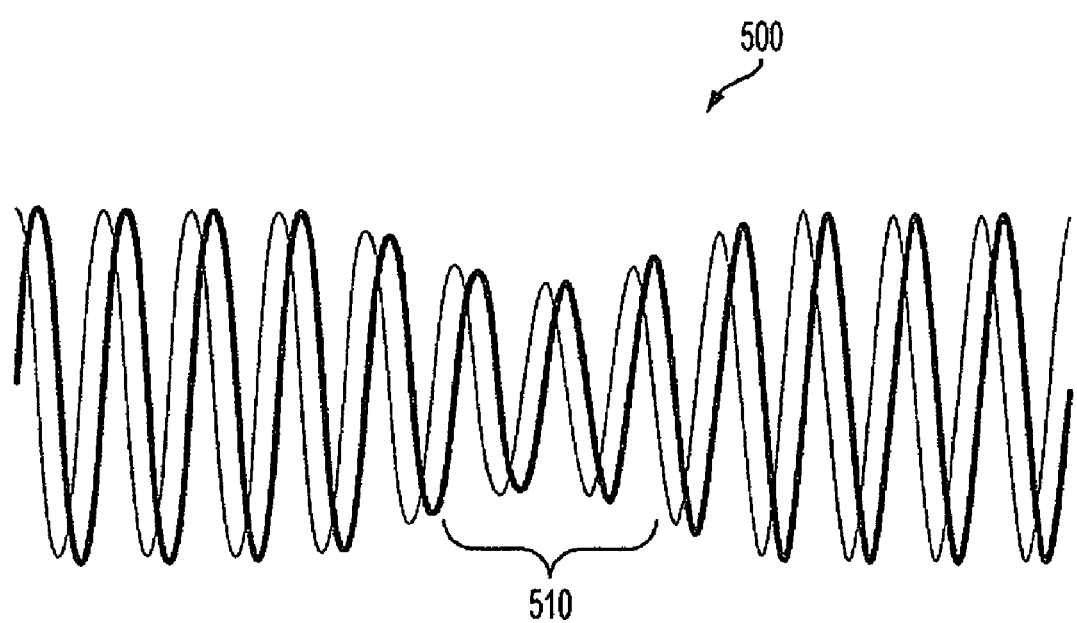
FIG. 4 illustrates a schematic representation of the sine and cosine waveforms of a quadrature signal that would be produced from the codewheel optical track as it passes through the gap between the emitter and the detectors of the optical encoder sensor of FIG. 2, in accordance with a preferred embodiment.

As the codewheel optical track 400 passes through the gap between the light source and sensor array of the encoder reader 330, the sine and cosine waveforms that comprise the quadrature signal are produced. A schematic illustration of these waveforms is illustrated in FIG. 4. The reduction of the quadrature signal amplitude indicates the home position 510 of the codewheel 310. For example, the analog sine and cosine waveforms can be inputted to the controller where they are digitized to binary numbers at a sample rate of 20 kHz. From these numbers representing the sine and cosine waveforms, an absolute magnitude signal can be calculated using equation (1) below.

Please note that the methods of converting analog electrical signals to binary or some other machine encoded values, and the manipulation and computation methods are well know to those skilled in the art and will not be discussed herein. To make the signal manipulation procedures of the present invention concise and more easily understandable, only graphical representations of the signals are shown and discussed herein.

$$\text{Magnitude} = \text{sqrt}(\sin\char`\^2 + \cos\char`\^2) \quad (1)$$

Figure 5:
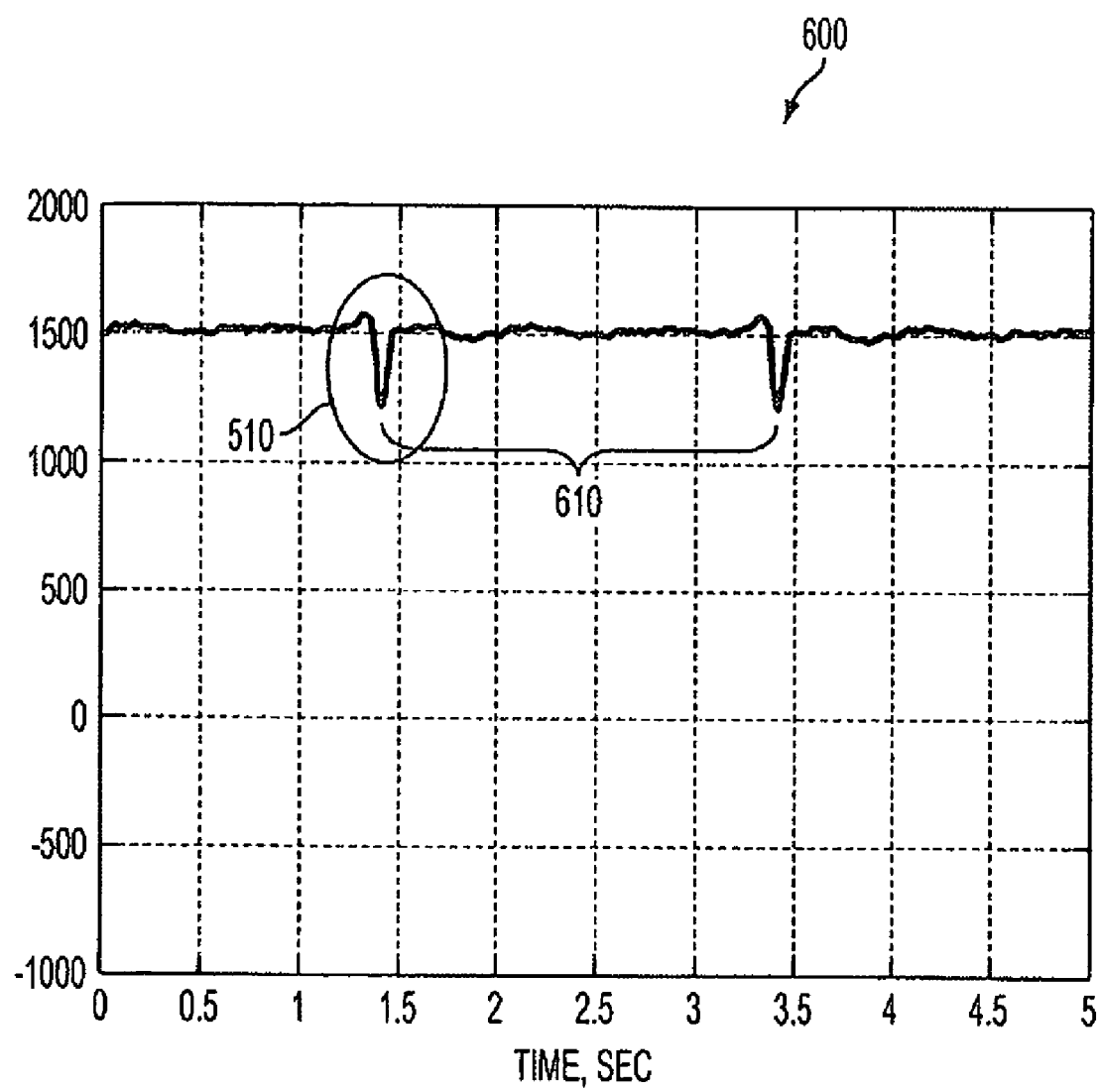
FIG. 5 illustrates a graphical representation of magnitude signal derived from the encoder quadrature output, in accordance with a preferred embodiment.

FIG. 5 illustrates a graphical representation of a magnitude signal 600 and depicts multiple revolutions of the print drum 300 of FIGS. 1-2. The two momentary drops in magnitude 510 depicted in FIG. 5 are home pulses and are generally produced by the home region of the codewheel optical track as it rotates through the sensor gap. The home pulse is produced one time each revolution of the codewheel so it can be seen that the distance 610 between consecutive home pulses represents one revolution of the print drum. In the unimproved home detection system, it is the lowest amplitude of these home pulses that the printer controller detects and interprets as the encoder and drum home position.

In addition to the intentional amplitude change caused by the home position encoded in the optical track, the overall amplitude of the magnitude signal is affected by the axial position of the codewheel within the encoder reader gap.

Figure 6:
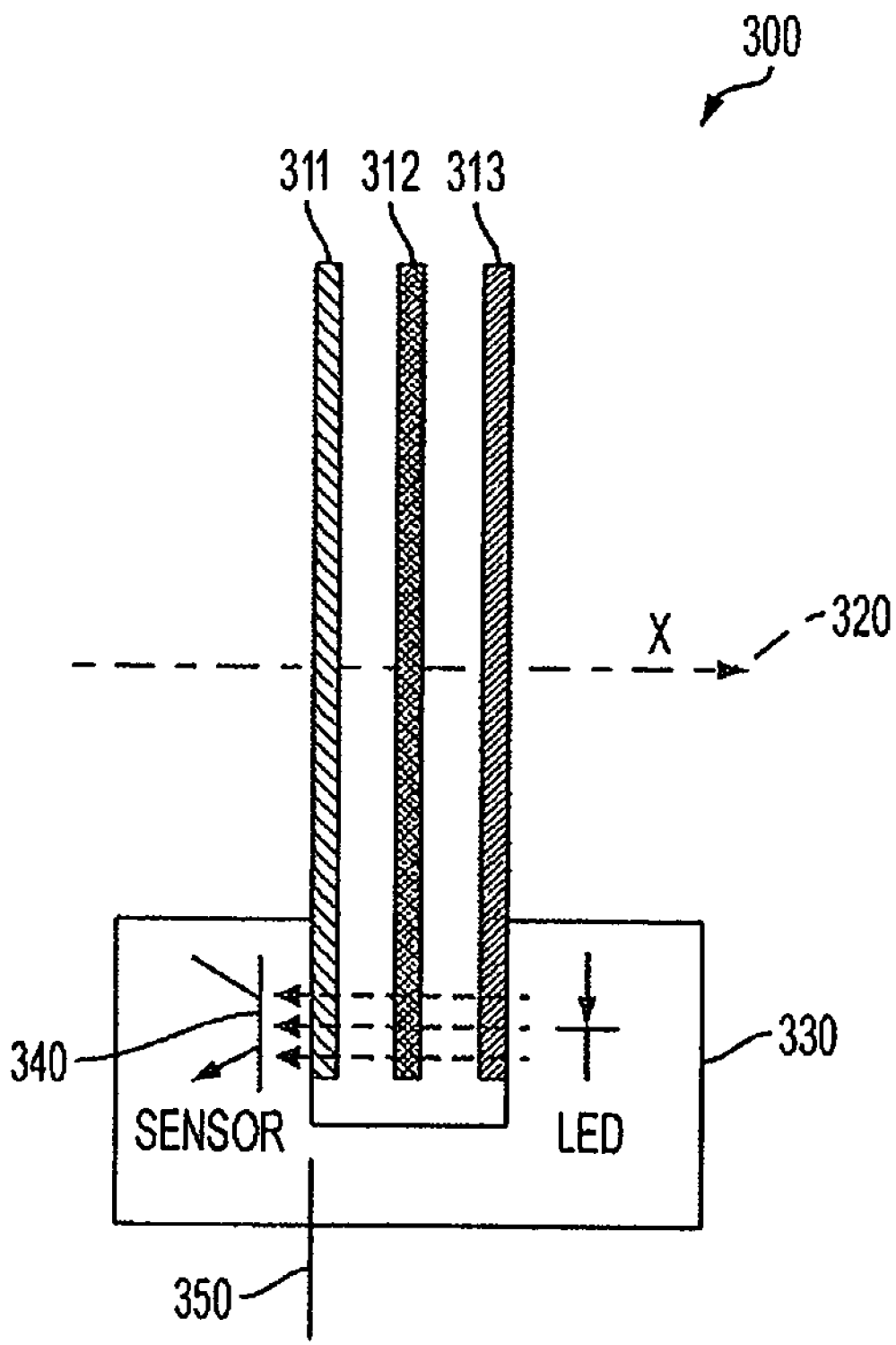
FIG. 6 illustrates a schematic view of an encoder system depicting intermediate and extremes of axial position of a codewheel, in accordance with a preferred embodiment.

FIG. 6 illustrates a schematic representation of the encoder system 240 depicting three codewheel positions 311, 312 and 313 of the codewheel 310.

Figure 7:
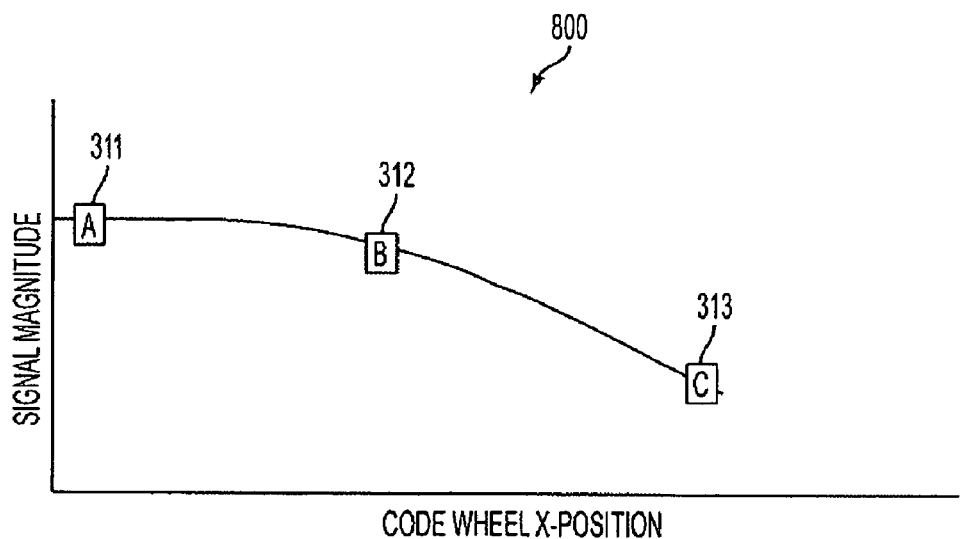
FIG. 7 illustrates a graphical representation of the signal magnitude verses codewheel axial position within the encoder sensor gap, in accordance with a preferred embodiment.

FIG. 7 illustrates a graphical representation 800 of the signal magnitude for three positions 311, 312 and 313 of the codewheel 310 as a function of codewheel axial position within the encoder reader gap. In this example position 312 can be taken as the nominal desired position of the codewheel with positions 311 and 313 being possible extreme positions. This axial motion of the codewheel 310 within the encoder reader gap results in undesired variation in the magnitude signal.

The magnitude signal amplitude can also be affected by dust, fingerprints and other types of contamination on the codewheel surface as well as variations in the codewheel materials, manufacturing process variations, print drum bearing axial play, codewheel non-flatness and other defects. All of these unintended magnitude signal variations can be thought of as signal noise that obscures the intended amplitude drop of the home pulse making it difficult for the controller to detect the home pulse or in some cases detect a false home pulse.

Figure 8:
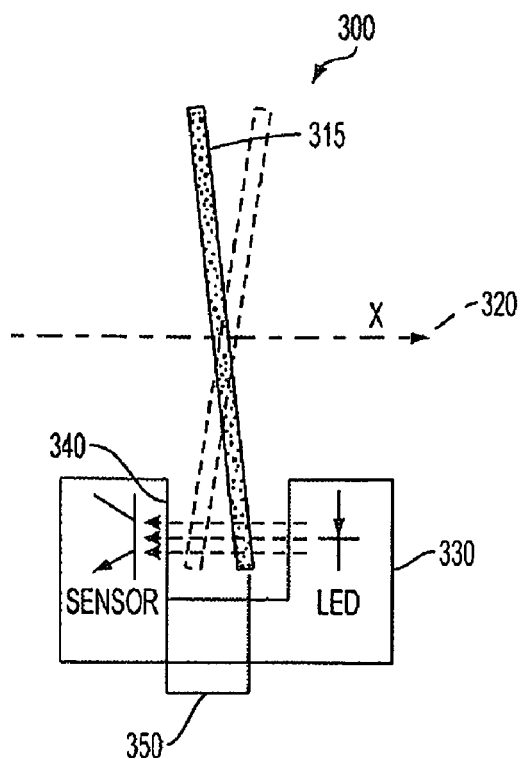
FIG. 8 illustrates a codewheel mounted at an angle other than 900 to an axis of rotation, in accordance with a preferred embodiment.

In some encoder system assemblies, one of the common problems is non-flatness of the codewheel and misalignment of the codewheel to the print drum axis. FIG. 8 schematically illustrates a codewheel 315 that is mounted non-perpendicular to an axis of rotation 320. A codewheel 315 that is mounted as such will vary axial position 350 within the gap of encoder reader 330 when rotated and causes undesired amplitude modulation of the magnitude signal with a frequency of 1 cycle per revolution. This modulation can cause the magnitude signal to increase or decrease and in some cases cause the magnitude signal to drop lower than the home pulse.

Figure 9:
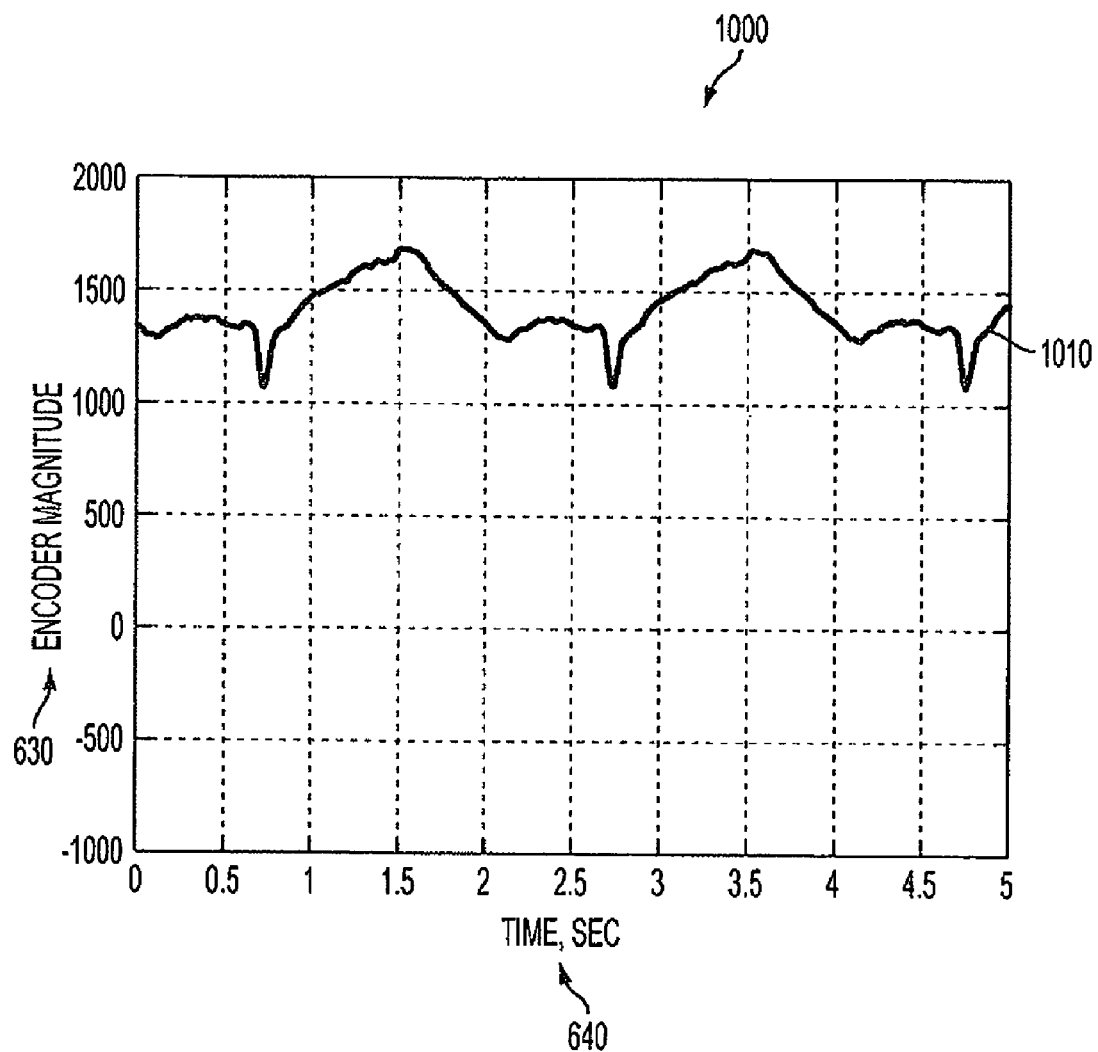
FIG. 9 illustrates a graphical representation of encoder magnitude variation predominantly caused by axial runout due to codewheel misalignment depicted in FIG. 10, in accordance with a preferred embodiment.

An example of a magnitude signal 1010 depicting the affects of axial run out caused by a codewheel 315 that is not mounted perpendicular to the axis of rotation 320 is illustrated as a graphical representation in FIG. 9. Axial runout can cause the magnitude to increase or decrease, but in this case the axial runout causes the magnitude signal to increase while leaving the home pulses largely unaffected.

Figure 10:
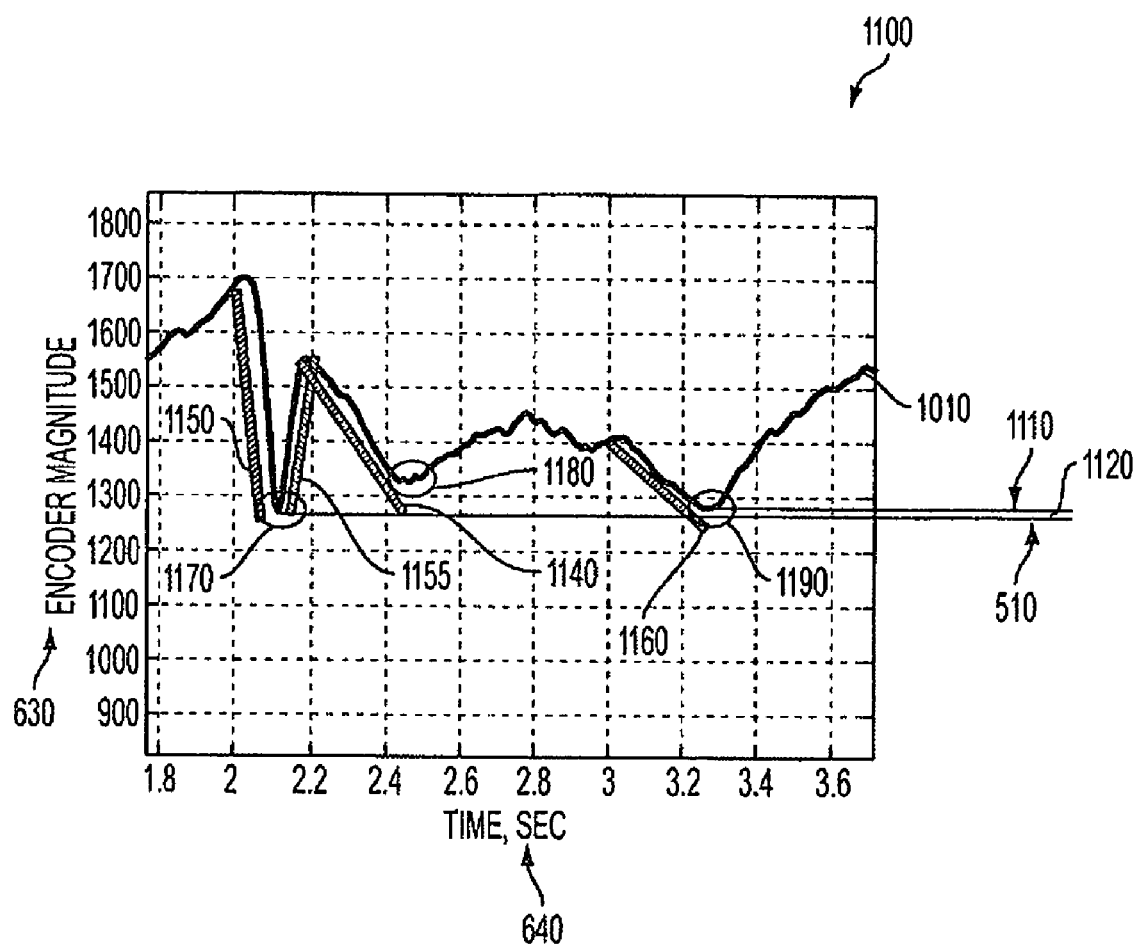
FIG. 10 illustrates a graphical view of three similar minimum magnitudes predominantly caused by axial runout of a codewheel, in accordance with a preferred embodiment.

FIG. 10 illustrates a graphical view 1100 of the magnitude signal generated by a codewheel 310 with four magnitude signal slopes indicated codewheel. In this example variation of the magnitude signal 1010 is affected by multiple causes. The home position 1170 can be a true home position whereas the positions 1180 and 1190 can be false home or noise signals caused by axial runout and other causes. As depicted, there is a very small magnitude difference 1120 between the minimum value of the true home signal 1170 and the noise signal 1190. The true home signal 1170 is indicated by a much steeper slope 1150 than the slopes 1140 and 1160. Also, the true home signal 1170 is characteristically followed by an immediate incline slope 1155. In this example the total combination of all codewheel 310 defects and runout create minimum magnitudes nearly equal to that of the intended home position.

Figure 11:
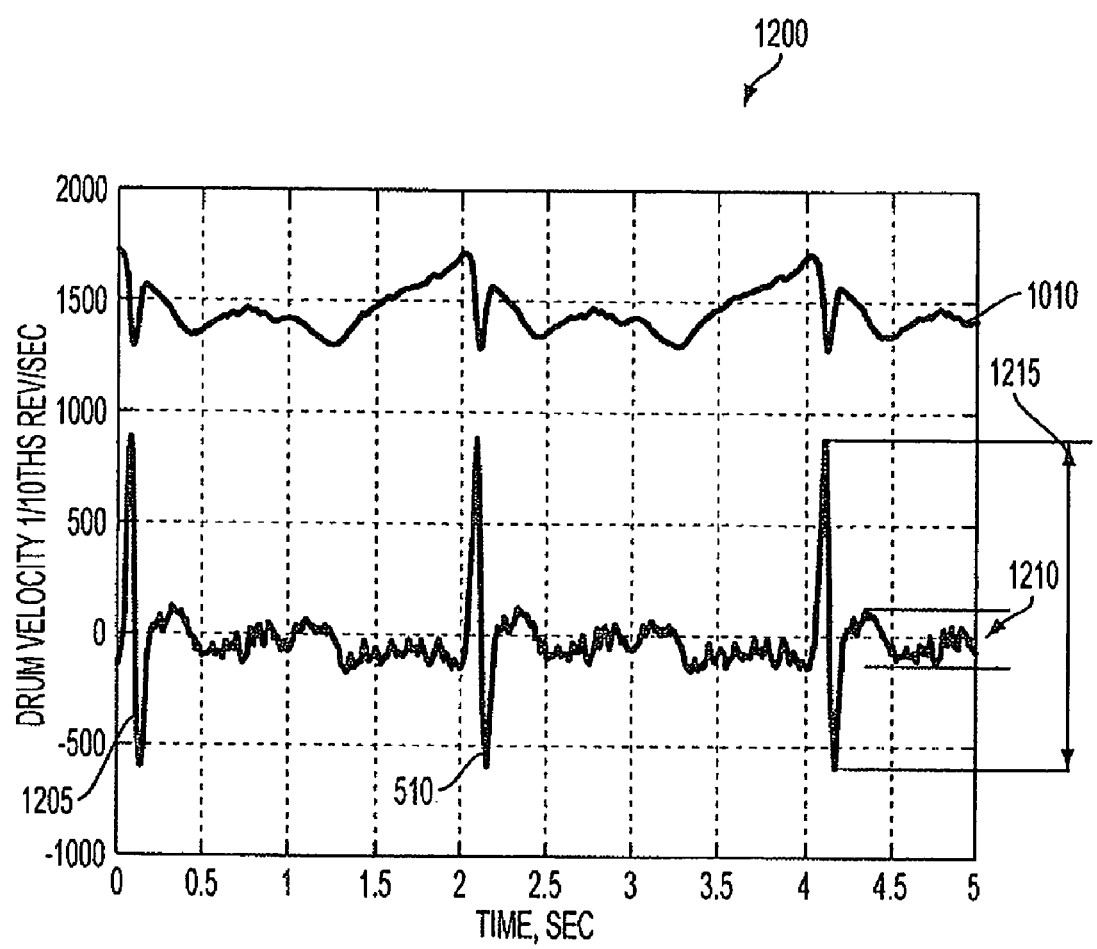
FIG. 11 illustrates a graphical representation of a magnitude signal and the ROC signal derived from it demonstrating the larger signal-to-noise ratio of the ROC signal, in accordance with a preferred embodiment.

An algorithm can be applied to the magnitude signal to create another signal that is a representation of the instantaneous rate of change of the magnitude signal (ROC signal). FIG. 11 illustrates a graphical representation 1200 of an encoder magnitude signal 1010 and the ROC signal 1205 derived from it. By inspecting the magnitude signal 1010 it can be seen that adjacent minimums of the encoder magnitude signal are of the same amplitude as the intentional home pulse, whereas inspecting the ROC signal 1205 it can be seen that the amplitude of the home position signal 1215 is much larger than the amplitude of the signal noise 1210. Thereafter, the ROC signal 1205 can also be filtered to further reduce signal noise.

As an illustrative example, the ROC signal can be derived from the encoder magnitude signal and then filtered in the following manner. The encoder magnitude signal 1010 can be sampled at 20 kHz. The present home magnitude sample value can be subtracted from the previous home magnitude sample. The result of this computation can be then divided by the known time between samples (in this example, 50 us due to the 20 kHz sample rate), giving a change per unit time and therefore a rate of change (ROC). In the example discussed herein, to further reduce noise, the ROC signal 1205 can be filtered by determining a running average of 256 consecutive samples. Thus, the ROC signal 1205 derived from the encoder magnitude signal 1010 provides a large signal to a noise ratio that very clearly differentiates the home pulses from the other encoder magnitude variations, in accordance with a preferred embodiment.

The unimproved home detection method previously located home by having an algorithm search for minimum amplitude of the encoder magnitude signal. This minimum is assigned as the home position and it is approximately centered between adjacent ROC maximum and minimum values. So, for simplicity and compatibility in the example illustrated, the home position assigned in conjunction with the ROC signal processing is centered between adjacent maximum and minimum ROC amplitudes.

Figure 12:
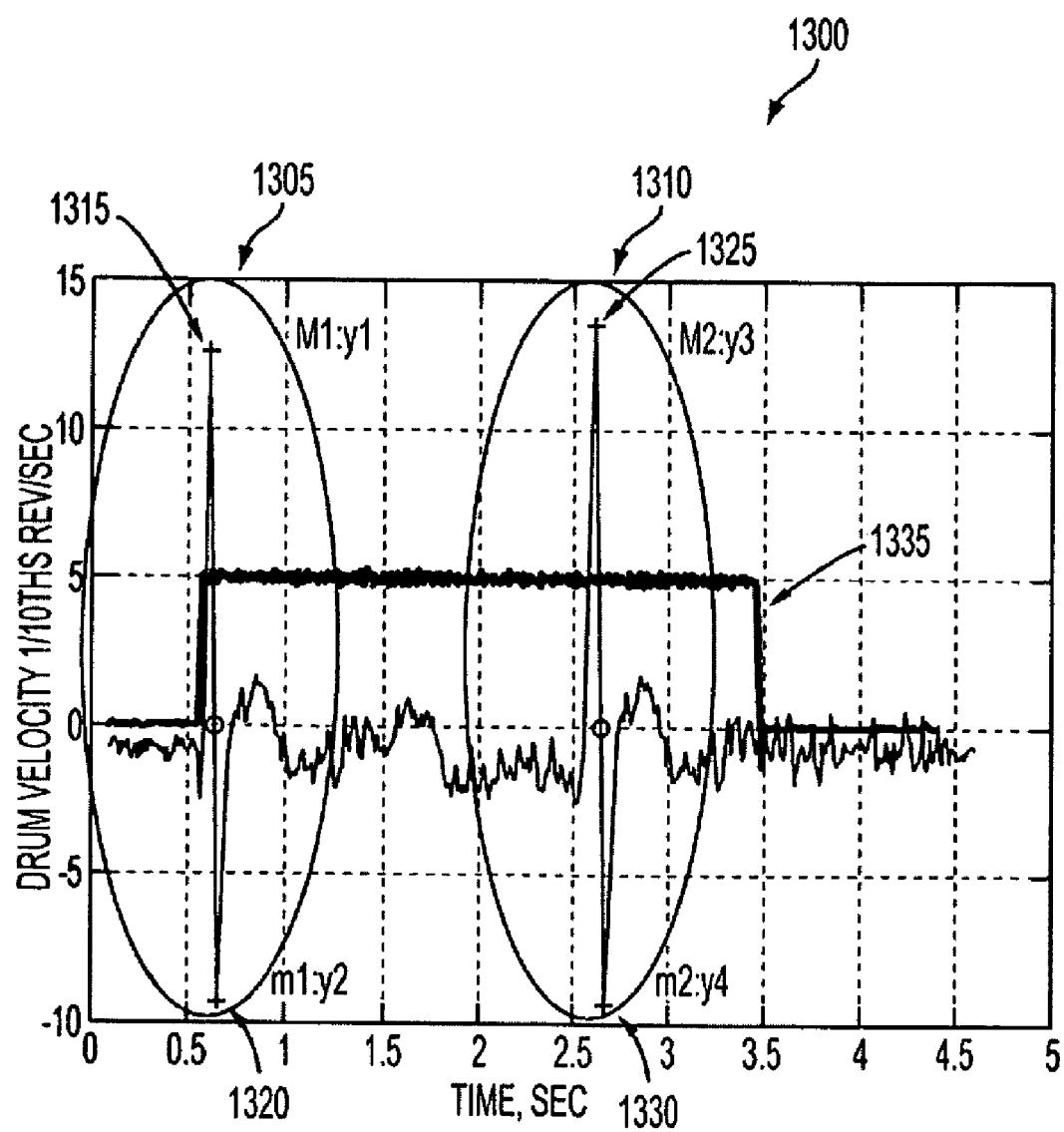
FIG. 12 illustrates a graphical representation of the ROC signals 1305 and 1310 with maximum and minimum ROC values 1315, 1320, 1325, 1330 and the print drum rotational velocity 1335, which can be implemented in accordance with a preferred embodiment.

FIG. 12 illustrates location 1315 maximum ROC value M1 corresponding to drum position y1. Minimum ROC value m1 corresponds to drum position y2 shown at location 1320. Similarly, there are drum positions y3 and y4 with corresponding magnitudes M2 and m2 respectively. A centered home position is calculated by the equations $(y1+y2)/2$ or $(y3+y4)/2$, depending on the set of adjacent ROC signal points selected. Note that it is not a requirement to select the home position as centered between the maximum and minimum ROC values and the present invention is not limited to using merely one maximum or one minimum in order to generate a home position. The home position chosen can be arbitrary and is only referenced to the ROC signal.

Along with the improved signal to noise ratio as compared with the previously used minimum magnitude homing method, the ROC signal home pulse has a characteristic shape. Knowledge of this shape can be taken advantage of for the purpose of generating a further more reliable and consistent home position. For example, by regulating the velocity of the print drum during sampling of the signal, the characteristic shape of the ROC signal can be maintained.

As illustrated in FIG. 12, the drum velocity 1335 is regulated to be constant while the ROC signal 1310 is generated. Furthermore, the ROC signal can be validated by algorithms or measures that, for example, determine the span between minimum and maximum values, determine the slope of the signal adjacent to the minimum and maximum, determine the difference between minimum and maximum amplitude, determine the ratio between the minimum and maximum amplitude, etc. and compare the results of these measures with the expected characteristics.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for processing an encoder's home position signal, comprising:

generating an absolute home magnitude signal by modulating a plurality of bar widths on an encoder disk associated with a codewheel having a codewheel surface, wherein said codewheel surface rotates perpendicularly to an axis of rotation;

generating a home pulse by rotating said codewheel one revolution, wherein said home pulse represents two consecutive momentary drops in said home magnitude;

using an encoder reader to output a sine and cosine quadrature signal when said codewheel rotates perpendicularly to said axis of rotation;

generating a rate of change signal by sampling said absolute home magnitude signal and filtering said rate of change signal in order to increase a signal-to-noise ratio; and determining a home position of said rate of change signal by applying a home position algorithm, wherein a signal characteristic shape of said rate of change signal increases the robustness of said home position associated with said rate of change signal in order to efficiently process said encoder home position signal and thereby enhance the effectiveness of a rendering device.

2. The method of claim 1 further comprising:
calculating a plurality of drum positions associated with at least one maximum rate of change value and at least one minimum rate of change value in order to determine said home position of said rate of change signal.

3. The method of claim 1 further comprising configuring said plurality of bar widths to be substantially uniformly spaced and pitched center to center.

4. The method of claim 1 wherein said encoder reader comprises an optical sensor.

5. The method of claim 1 wherein said rendering device comprises a printer having at least one print head.

6. The method of claim 5 wherein said home position of said rate of change signal compensates a process direction alignment of said print head which assists in increasing the print quality of said printer.

7. The method of claim 1 further comprising:
configuring said encoder reader to comprise an optical sensor;
calculating a plurality of drum positions associated with at least one maximum rate of change value and at least one minimum rate of change value in order to determine said home position of said rate of change signal; and
configuring said plurality of bar widths to be substantially uniformly spaced and pitched center to center.

8. A system for processing an encoder's home position signal, comprising:
a processor;
a data bus coupled to said processor; and
a computer-usable medium embodying computer code, said computer-usable medium being coupled to said data bus, said computer program code comprising instructions executable by said processor and configured for:
generating an absolute home magnitude signal by modulating a plurality of bar widths on an encoder disk associated with a codewheel having a codewheel surface, wherein said codewheel surface rotates perpendicularly to an axis of rotation;
generating a home pulse by rotating said codewheel one revolution, wherein said home pulse represents two consecutive momentary drops in said home magnitude;
using an encoder reader to output a sine and cosine quadrature signal when said codewheel rotates perpendicularly to said axis of rotation;
generating a rate of change signal by sampling said absolute home magnitude signal and filtering said rate of change signal in order to increase a signal-to-noise ratio; and
determining a home position of said rate of change signal by applying a home position algorithm, wherein a signal characteristic shape of said rate of change signal increases the robustness of said home position associated with said rate of change signal in order to efficiently process said encoder home position signal and thereby enhance the effectiveness of a rendering device.

9. The system of claim 8 wherein said instructions are further configured for:
calculating a plurality of drum positions associated with at least one maximum rate of change value and at least one minimum rate of change value in order to determine said home position of said rate of change signal.

10. The system of claim 8 wherein said plurality of bar widths are configured to be substantially uniformly spaced and pitched center to center.

11. The system of claim 8 wherein said encoder reader comprises an optical sensor.

12. The system of claim 8 wherein said rendering device comprises a printer having at least one print head.

13. The system of claim 12 wherein said instructions are further configured to permit said home position of said rate of change signal to compensate a process direction alignment of said print head which assists in increasing the print quality of said printer.

14. The system of claim 8 wherein said encoder comprises an optical sensor and said instructions are further configured for:
calculating a plurality of drum positions associated with at least one maximum rate of change value and at least one minimum rate of change value in order to determine said home position of said rate of change signal; and
configuring said plurality of bar widths to be substantially uniformly spaced and pitched center to center.

15. A computer-usable medium embodying computer program code, said computer program code comprising computer executable instructions configured for:
generating an absolute home magnitude signal by modulating a plurality of bar widths on an encoder disk associated with a codewheel having a codewheel surface, wherein said codewheel surface rotates perpendicularly to an axis of rotation;
generating a home pulse by rotating said codewheel one revolution, wherein said home pulse represents two consecutive momentary drops in said home magnitude;
using an encoder reader to output a sine and cosine quadrature signal when said codewheel rotates perpendicularly to said axis of rotation;
generating a rate of change signal by sampling said absolute home magnitude signal and filtering said rate of change signal in order to increase a signal-to-noise ratio; and
determining a home position of said rate of change signal by applying a home position algorithm, wherein a signal characteristic shape of said rate of change signal increases the robustness of said home position associated with said rate of change signal in order to efficiently process said encoder home position signal and thereby enhance the effectiveness of a rendering device.

16. The computer-usable medium of claim 15 wherein said embodied computer program code further comprises computer executable instructions configured for:
calculating a plurality of drum positions associated with at least one maximum rate of change value and at least one minimum rate of change value in order to determine said home position of said rate of change signal.

17. The computer-usable medium of claim 15 wherein each bar width among said plurality of bar widths is substantially uniformly spaced and pitched center to center.

18. The computer-usable medium of claim 15 wherein said encoder reader comprises an optical sensor.

19. The computer-usable medium of claim 15 wherein said rendering device comprises a printer having at least one print head.

20. The computer-usable medium of claim 19 wherein said embodied computer program code further comprises computer executable instructions configured to permit said home position of said rate of change signal to compensate a process direction alignment of said print head which assists in increasing the print quality of said printer.

* * * * *